United States Patent
Lakshman et al.

(10) Patent No.: US 9,411,825 B2
(45) Date of Patent: Aug. 9, 2016

(54) COMPUTER IMPLEMENTED SYSTEM FOR HANDLING TEXT DISTRACTERS IN A VISUAL SEARCH

(71) Applicant: STREAMOID TECHNOLOGIES PVT. LTD., Bangalore (IN)

(72) Inventors: Haricharan Lakshman, Bangalore (IN); Kinshuk Sarabhai, Bangalore (IN)

(73) Assignee: STREAMOID TECHNOLOGIES PVT. LTD., Bangalore (IN)

( * ) Notice: Subject to any disclaimer, the term of this patent is extended or adjusted under 35 U.S.C. 154(b) by 42 days.

(21) Appl. No.: 14/583,031

(22) Filed: Dec. 24, 2014

(65) Prior Publication Data

US 2015/0186421 A1    Jul. 2, 2015

(51) Int. Cl.
*G06F 17/30* (2006.01)
*G06T 5/00* (2006.01)
*G06K 9/00* (2006.01)

(52) U.S. Cl.
CPC .... *G06F 17/30253* (2013.01); *G06F 17/30256* (2013.01); *G06K 9/00456* (2013.01); *G06T 5/002* (2013.01)

(58) Field of Classification Search
CPC .............. G06K 9/00456; G06F 17/30864; G06F 17/30253; G06F 17/30256
See application file for complete search history.

(56) References Cited

U.S. PATENT DOCUMENTS

| | | | | |
|---|---|---|---|---|
| 2003/0223637 A1* | 12/2003 | Simske | ............ | G06F 17/30011 382/176 |
| 2006/0251339 A1* | 11/2006 | Gokturk | ............ | G06F 17/30253 382/305 |
| 2009/0203368 A1* | 8/2009 | Marsyla | ............ | G06F 9/45512 455/418 |
| 2010/0070529 A1* | 3/2010 | Gokturk | ................ | G06Q 30/02 707/780 |
| 2011/0125735 A1* | 5/2011 | Petrou | ............... | G06F 17/30277 707/723 |

* cited by examiner

*Primary Examiner* — Stephen R Koziol
*Assistant Examiner* — Shaghayegh Azima
(74) *Attorney, Agent, or Firm* — Barry Choobin; Patent 360 LLC (57) ABSTRACT

A system, method and a computer program product for handling text distracters in a visual search have been disclosed. The system considers an image captured on a handheld device, as a query image and subsequently identifies the textual portions of the query image. The textual portions of the query image are smoothened in order to reduce the keypoints present in the textual portions. Non-textual portions in proximity to the textual portions are also selectively smoothened in order to prevent formation of an artificial border between the textual portions and non-textual portions. Further, the features are extracted from the non-textual portions of the query image are compared with the features of the images stored in a repository. An image whose features match with the extracted features is identified as an image relevant to the query image, and the identified image is transmitted, along with the associated metadata to the handheld device for display.

16 Claims, 3 Drawing Sheets

COMPUTER IMPLEMENTED SYSTEM FOR HANDLING TEXT DISTRACTERS IN A VISUAL SEARCH

CROSS REFERENCE TO RELATED APPLICATIONS

This patent application claims the priority of the Indian Provisional Patent Application with serial number 6180/CE/2013 filed on Dec. 31, 2013, having the title "Method and system for handling text distracters in mobile visual search", and the contents of which are incorporated in its entirety by reference herein.

BACKGROUND

1. Technical Field

The present disclosure relates to the field of information search. Particularly, the present disclosure relates to the field of visual search.

2. Description of the Related Art

The use of mobile devices, such as cellular phones or personal digital assistant (PDA) devices has increased exponentially in the last decade. Often, such mobile devices include a camera and a display screen for displaying images at which the camera is pointed. Since people often carry their camera-enabled mobile devices with them, it would be beneficial to provide additional mobile applications for utilizing the camera and display capabilities of such prevalent mobile devices.

In a typical mobile visual search application, a query image is matched with a set of images in a repository and the metadata associated with the matched repository image is presented to the user. A typical application is to click a photo (query image) using a Smartphone and transmit it to a central server where an image-based search is carried out to identify matching images from a repository and the relevant information about the query image is presented to the user.

Several algorithms are available for image matching using local features and/or global features of a query image. For certain applications which involve capturing an image of a part of a newspaper magazine, considering the captured image as query image and retrieving information about the query image, one of the main challenges is to tackle the textual information surrounding the actual region of interest in the captured image.

Typically, textual information has a sharp contrast compared to its background and hence produces a large number of local features, e.g. when using the SIFT technique, many keypoints lie around the textual information. If a plurality of images stored in the repository, and a query image comprising text distracters are treated as regular images, to find out a match between the respective feature descriptors, certain characters of the textual information present in the query image may match with certain characters present in an image(s) stored in the repository. Thus a decision solely based on such feature matches may indeed turn out to be inappropriate. Such inappropriate matches are called false positives. It is observed that incase of typical image matching applications, approximately 40% of false positives are created due to the presence of text distracters.

Hence there was felt a need for a method that improves the image matching accuracy despite the presence of text distracters. There was also felt a need for a method and system that finds a near perfect match, effectively and efficiently, for the query image amongst the repository images.

The above mentioned shortcomings, disadvantages and problems are addressed herein and which will be understood by reading and studying the following specification.

OBJECTIVES OF THE EMBODIMENTS

The primary object of the present disclosure is to provide a method and system for handling text distracters in mobile visual search.

Another object of the present disclosure is to provide a matching system that finds an accurate match between a query image and a plurality of images stored in a repository.

Still a further object of the present disclosure is to provide a system and method that improves the accuracy corresponding to matching a query image with a plurality of images stored in a repository.

Yet another object of the present disclosure is to provide a method and system for identifying and blurring text areas in the repository images prior to extracting features therefrom.

Yet another object of the present disclosure is to provide a method and system which eliminates text distracters in an image by removing the pixels corresponding to the text information present in the image.

These and other objects and advantages of the present disclosure will become readily apparent from the following detailed description taken in conjunction with the accompanying drawings.

SUMMARY

The present disclosure envisages a computer implemented system for managing text distracters in a visual search. The system, in accordance with the present disclosure comprises a handheld device accessible to a user, the handheld device comprising image capturing capabilities, the handheld device configured to capture an image, and express captured image as a query image for eliciting at least the information relevant to the captured image.

The system, in accordance with the present disclosure comprises a text detection module configured to process the query image and identify from processed query image, the regions having textual content, the text detection module further configured to identify from the processed query image, the regions having non-textual content.

The system, in accordance with the present disclosure comprises a smoothing filter configured to filter the regions identified as having textual content thereby reducing the keypoints therein, the smoothing filter configured to replace the pixels corresponding to the textual content with a first set of pixels thereby removing the textual content, the smoothing filter further configured to filter the regions having non-textual content, only in the event that the regions having non-textual content are found in proximity to the regions having textual content.

The system, in accordance with the present disclosure comprises a feature extraction module configured to extract a plurality of features from the regions having non-textual content.

The system, in accordance with the present disclosure comprises a repository configured to store a plurality of images and the features thereof, wherein the features are extracted from at least non-textual regions of the images.

The system, in accordance with the present disclosure comprises a comparator configured to compare the features extracted by the feature extraction module and the features corresponding to the images stored in the repository, the comparator further configured to extract from the repository the image having features that match the features extracted by the feature extraction module, the comparator still further configured to transmit the image extracted from the repository, along with associated metadata, to the handheld device accessible to the user, for display.

In accordance with the present disclosure, the smoothing filter is further configured to process the regions having textual content, the smoothing filter further configured to calculate an average value corresponding to each of the color planes, and repetitively fill each of the regions having textual content with pixels having a pixel value equal to the average value, thereby removing the textual content.

In accordance with the present disclosure, the feature extraction module is further configured to identify a plurality of features from the regions having non-textual content, the feature extraction module still further configured to generate a plurality of feature descriptors therefrom.

In accordance with the present disclosure, the comparator is further configured to compute a score between the features extracted by the feature extraction module and the features corresponding to the images stored in the repository.

In accordance with the present disclosure, the score is a function of distance between the features extracted by the feature extraction module and the features corresponding to the images stored in the repository, the distance selected from the group consisting of hamming distance, sum of squared errors, sum of absolute errors and maximum absolute error.

In accordance with the present disclosure, the text detection module is further configured to process, in an offline mode, each of the images stored in the repository, the text detection module configured to identify from processed images the regions having textual content, and the regions having non-textual content.

In accordance with the present disclosure, the smoothing filter is further configured to filter, in the offline mode, the regions having textual content thereby reducing the keypoints therein, the smoothing filter configured to replace, in the offline mode, the pixels corresponding to the textual content with a first set of pixels thereby removing the textual content, the smoothing filter further configured to filter, in the offline mode, the regions having non-textual content, only in the event that the regions having non-textual content are found in proximity to the regions having textual content.

In accordance with the present disclosure, the feature extraction module further configured to extract, offline, a plurality of features from the regions having non-textual content, the feature extraction module further configured to link extracted features with the corresponding images stored in the repository.

The resent disclosure envisages a computer implemented method for managing text distracters in a visual search. The method, in accordance with the present disclosure comprises the following computer-implemented steps:
- capturing an image using a handheld device and expressing captured image as a query image for eliciting at least the information relevant to the captured image;
- processing the query image using a text detection module and identifying from processed query image, the regions having textual content;
- processing the query image using a text detection module and identifying from processed query image, the regions having non-textual content;
- filtering the regions identified as having textual content, using a smoothing filter, and replacing the pixels corresponding to the textual content with a first set of pixels, thereby removing the textual content;
- filtering the regions having non-textual content, using the smoothing filter, only in the event that the regions having non-textual content are found in proximity the regions having textual content;
- extracting a plurality of features from the regions having non-textual content, using a feature extraction module;
- storing a plurality of images and the features thereof in a repository;
- comparing the features extracted by the feature extraction module and the features corresponding to the images stored in the repository, using a comparator;
- extracting from the repository the image having features that match the features extracted by the feature extraction module, and transmitting the image extracted from the repository, along with associated metadata, to the handheld device accessible to the user, for display.

In accordance with the present disclosure, the method comprises the step of processing the regions having textual content, and replacing the pixels corresponding to the textual content with a first set of pixels thereby removing the textual content, wherein the values of the first set of pixels are computed by the smoothing filter.

In accordance with the present disclosure, the step of replacing the pixels corresponding to the textual content with a first set of pixels further includes the following steps:
- processing the regions having textual content, using smoothing filter; and calculating an average value corresponding to each of the color planes of the regions having textual content, and repetitively filling each of the regions having textual content with pixels having a value equal to the average value.

In accordance with the present disclosure, the step of extracting a plurality of features from the regions having non-textual content further includes the step of generating a plurality of feature descriptors.

In accordance with the present disclosure, the step of comparing the features further includes the step of computing, using the comparator, a score between the features extracted by the feature extraction module and the features corresponding to the images stored in the repository.

In accordance with the present disclosure, the step of computing a score further includes the step of representing the score as a function of distance between the features extracted by the feature extraction module and the features corresponding to the images stored in the repository.

In accordance with the present disclosure, the method further includes the following steps:
- processing offline, each of the images stored in the repository;
- identifying, offline, from processed images, the regions having textual content; and the regions having non-textual content.
- filtering, offline, the regions having textual content thereby reducing the keypoints therein, and replacing, offline, the pixels corresponding to the textual content with a first set of pixels thereby removing the textual content;
- filtering, offline, the regions having non-textual content, only in the event that the regions having non-textual content are found in proximity to the regions having textual content; and
- extracting, offline, a plurality of features from the regions having non-textual content;
- generating, offline, a plurality of feature descriptors corresponding to the extracted features; and
- linking extracted features with the corresponding images stored in the repository.

The present disclosure envisages a non transitory computer readable medium having computer readable instructions stored thereupon, the instructions when executed by a processor cause a computer enabled device to:

capture an image express captured image as a query image for eliciting at least the information relevant to the captured image;

process the query image and identify from processed query image, the regions having textual content, and the regions having non-textual content;

filter the regions identified as having textual content and replace the pixels corresponding to the textual content with a first set of pixels having predetermined pixel values, thereby removing the textual content; selectively filter the regions having non-textual content, only in the event that the regions having non-textual content are found in proximity to the regions having textual content;

extract a plurality of features from the regions having non-textual content;

store a plurality of images and the features thereof, in a repository; compare the extracted features and stored features;

identify the image having features that match the extracted features and display the identified image.

The computer readable instructions, when executed by the processor, further cause the computer enabled device to:

process the regions having textual content, and calculate an average value corresponding to each of the color planes of the regions having textual content, and repetitively fill each of the regions having textual content with pixels having a value equal to the average value.

extract a plurality of features from the regions having non-textual content and generate a plurality of feature descriptors.

compute a score between the features extracted by the feature extraction module and the features corresponding to the images stored in the repository.

represent the score as a function of distance between the features extracted by the feature extraction module and the features corresponding to the images stored in the repository.

The computer readable instructions, when executed by the processor, further cause the computer enabled device to:

process offline, each of the images stored in the repository;

identify, offline, from processed images, the regions having textual content; and the regions having non-textual content.

filter, offline, the regions having textual content thereby reducing the key points therein, and replace, offline, the pixels corresponding to the textual content with a first set of pixels thereby removing the textual content;

filter, offline, the regions having non-textual content, only in the event that the regions having non-textual content are found in proximity to the regions having textual content; and extract, offline, a plurality of features from the regions having non-textual content;

generate, offline, a plurality of feature descriptors corresponding to the extracted features; and link extracted features with the corresponding images stored in the repository.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present disclosure are shown in some drawings and not in others, this is done for convenience only as each feature may be combined with any or all of the other features in accordance with the present disclosure.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

There was felt a need for a computer implemented system, method and a computer program product for enabling an effective and efficient visual search. In a first embodiment, the present disclosure envisages a computer implemented system for handing text distracters in a visual search, thereby enhancing the efficiency and effectiveness of the said visual search.

Figure 1:
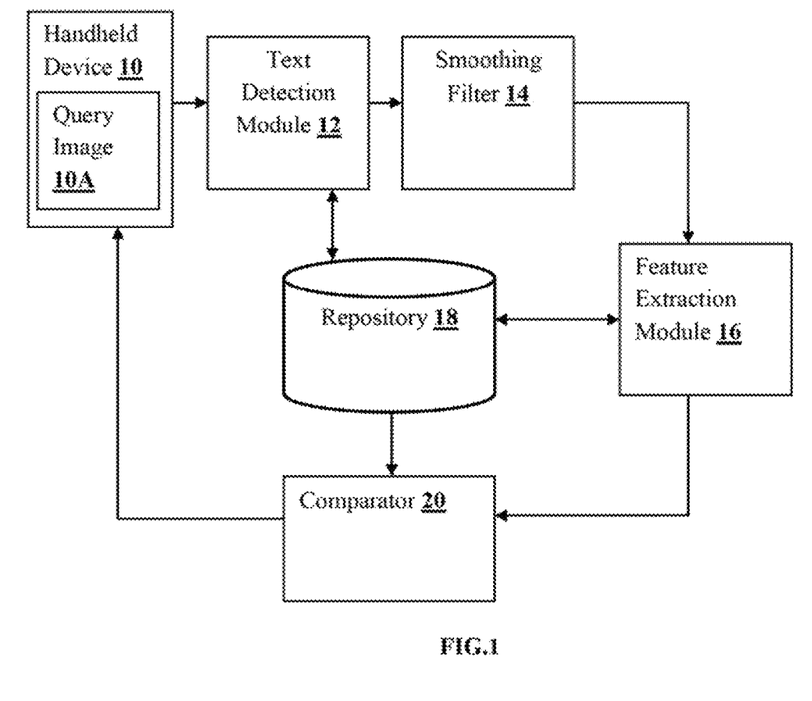
FIG. 1 is a block diagram illustrating architecture of a system for managing text distracters in a visual search, according to the present disclosure.

Referring to FIG. 1, there is shown a computer implemented system 100 for handling text distracters in a visual search. The system 100 includes a handheld device 10 accessible to a user. The handheld device 10 can be one of a mobile phone, a cellular phone, an iPad, a tablet PC, and a laptop. The handheld device 10, in accordance with the present disclosure is equipped with camera, and is capable of initiating communication with at least a remote server (not shown in figures), typically a server having image processing capabilities, when connected thereto via any wireless communication technology (including but not restricted to GPRS, Wi-Fi, Bluetooth, Infrared and the like) or any wired communication technology.

In accordance with the present disclosure, the user makes use of the said handheld device 10 to capture a picture. Subsequently, the functions of the system 100 envisaged by the present disclosure are rendered relevant in the event that the user wishes to elicit more information about the captured image, by treating/expressing the captured image as a query image.

In accordance with the present disclosure, the handheld device 10 cooperates with a text detection module 12. The communication between the handheld device 10 and the text detection module is established only after the user expresses his desire to use the captured image as a query image and elicit further information relating to the query image. The text detection module 12 is typically a part of the server having image processing capabilities. However, it is also within the scope of the present disclosure to integrate the functionalities of the text detection module 12 into the handheld device 10.

In accordance with the present disclosure, the text detection module 12 is configured to process the query image and identify the textual regions of the query image. The text detection module 12 identifies from the query image, the regions incorporating any textual content. The text detection module 12 employs well known text detection techniques including but not restricted to Stroke Width Transform (SWT) technique (typically utilized for capturing only text effective features and using geometric signature of text to filter out non-text areas), Maximally Stable External Regions technique for blob detection in images, and Multi-Resolution approach for detecting text in natural images. Further, the text detection module 12 is configured to separate/segregate the textual regions of the query image from the non-text regions of the query image, using any of the aforementioned techniques.

In accordance with the present disclosure, the system 100 further comprises a smoothing filter denoted by reference numeral 14. The smoothing filter 14 cooperates with the text detection module 12 to receive the query image. The smoothing filter 14 specifically processes the textual regions (regions having textual content) of the query image, in order to reduce the details (including but not restricted to brightness, contrast, hue, sharpness, saturation) associated with the textual regions, so as to ensure that lesser keypoints are detected from the textual regions of the query image. Further, the smoothing filter 14 processes the regions of the query image having textual content, and replaces the pixels corresponding to the textual content with a first set of pixels. The pixel values of the first set of pixels are also computed by the smoothing filter 14. The smoothing filter 14 typically computes a suitable average value (including mean, weighted mean, median) over pixels in proximity to a reference image pixel and sets the image intensity of the reference pixel to the average value. The smoothing filter 14 processes the regions (of the query image 10A) having textual content, and calculates an average value corresponding to each of the color planes, and repetitively fills each of the textual regions with pixels having a value equal to the calculated average value, thereby replacing the textual content with non-textual content (pixels having a value equivalent to the average value).

The smoothing filter 14 typically considers one of the pixels of the query image as a reference image pixel and computes a suitable average (at least one of mean, weighted mean, median) corresponding to the pixels that surround the reference image pixel. The smoothing filter 14 subsequently sets the intensity of the reference pixel to the average value and the pixels in proximity to the reference pixel are replace with the first set of pixels, wherein each of the pixels in the first set of pixels incorporates a pixel value equivalent to the average value.

The aforementioned procedure is repeated by the smoothing filer 14 in respect of the query image 10A until all the textual regions of the query image are processed. The smoothing filter 14 provides for excluding the textual regions of the query image 10A from further processing and consideration. In accordance with the present disclosure, the smoothing filter 14 is further configured to process the non-textual regions (of the query image 10A) which in proximity to the textual regions of the query image 10A, in order to avoid introduction of an artificial border between the textual regions and non-textual regions of the query image 10A.

In accordance with the present disclosure, the system 100 further includes a feature extraction module 16 cooperating with the text detection module 12 and the smoothing filter 14 to receive the query image 10A (processed by the text detection module 12 and the smoothing filter 14 respectively). The feature extraction module 16 is configured to extract a plurality of (algorithm-specific) features from at least the non-textual regions of the query image 10A. The feature extraction module 16 makes use of algorithms, including but not restricted to SIFT algorithm, SURF algorithm to extract local features from the query image 10A. Further, the feature extraction module 16 makes use of algorithms, including but not restricted to VLAD algorithm, CFV algorithm to extract global features from the query image 10A.

In accordance with the present disclosure, the system 100 further includes a repository 18 storing a plurality of images. The system 100 envisaged by the present disclosure provides for searching the repository 16 for the images that closely correspond to the query image 10A.

In accordance with the present disclosure, the text detection module 12 cooperates with the repository 18 to process (typically, offline) the images stored in the repository 18. The text detection module 12 subsequently identifies (typically, offline) the textual regions present in each of the images stored in the repository 18. The text detection module 12 identifies and separates (typically, offline) the textual regions of the images (stored in the repository 18) from the non-text regions of the image (stored in the repository 18), using any of the techniques explained in the aforementioned paragraphs.

Further, the smoothing filter 14 cooperates with the repository 18 to specifically processes (typically, offline) the textual regions (regions having textual content) of the images stored in the repository 18, in order to reduce the details (including but not restricted to brightness, contrast, hue, sharpness, saturation) associated with the textual regions thereof, so as to ensure that lesser keypoints are detected from the textual regions of each of the images stored in the repository 18. The reduction in the details associated with the textual regions of the images (stored in the repository 18) also takes place in offline mode.

Further, the feature extraction module 16 extracts, typically in an offline mode, a plurality of (algorithm-specific) features from at least the non-textual regions of the images stored in the repository 18. The feature extraction module 16 further generates, in the offline mode, a plurality of feature descriptors corresponding to the images stored in the repository 18.

The feature extraction module 16 makes use of at least one of SIFT algorithm, SURF algorithm to extract (in the offline mode) local features from the images stored in repository 18. Further, the feature extraction module 16 makes use of at least one of VLAD algorithm, CFV algorithm to extract (in the offline mode) global features from the images stored in the repository 18. Further, the extracted features are also stored in the repository 18 along with a link to the respective images, i.e., each of the images stored in the repository 18 are linked to the respective extracted features.

The system 100, in accordance with the present disclosure includes a comparator denoted by the reference numeral 20. The comparator 20 cooperates with the feature extraction module 16 to receive the features extracted from the query image 10A. Further, the comparator 20 cooperates with the repository 18 to access each of the stored images and the features thereof. The comparator 20 compares the features extracted from the query image 10A module and the features corresponding to the images stored in the repository 18. The comparator 20 is configured to compute a score between the features extracted from the query image 10A and the features corresponding to the images stored in the repository 18. The score calculated by the comparator 20 is a function of distance between the features extracted from the query image 10A and the features corresponding to the images stored in the repository 18. Typically, the distance selected from the group consisting of hamming distance, sum of squared errors, sum of absolute errors and maximum absolute error. The comparator 20 subsequently extracts from the repository 18 the image having features that match the features extracted from the query image 10A, and transmits the extracted image to the handheld device 10 accessible to the user, for display.

Figure 2A:
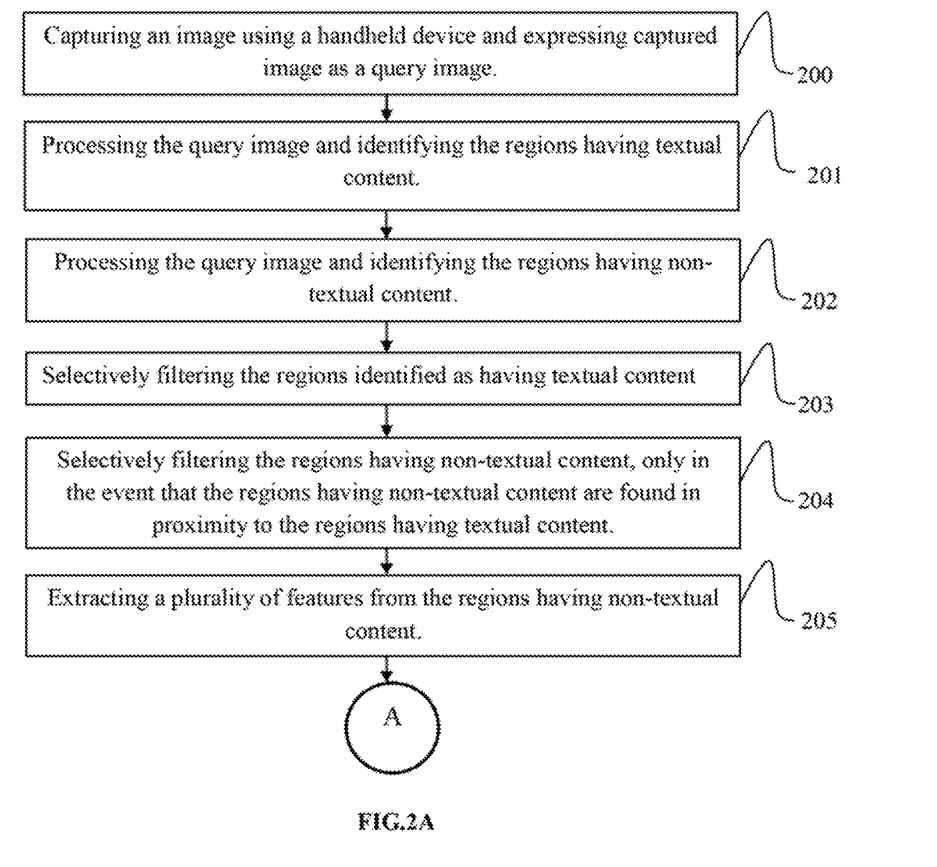
FIG. 2A and FIG. 2B in combination describe a flow chart illustrating the steps involved in the computer implemented method for handling text distracters in a visual search, according to the present disclosure.
Figure 2B:
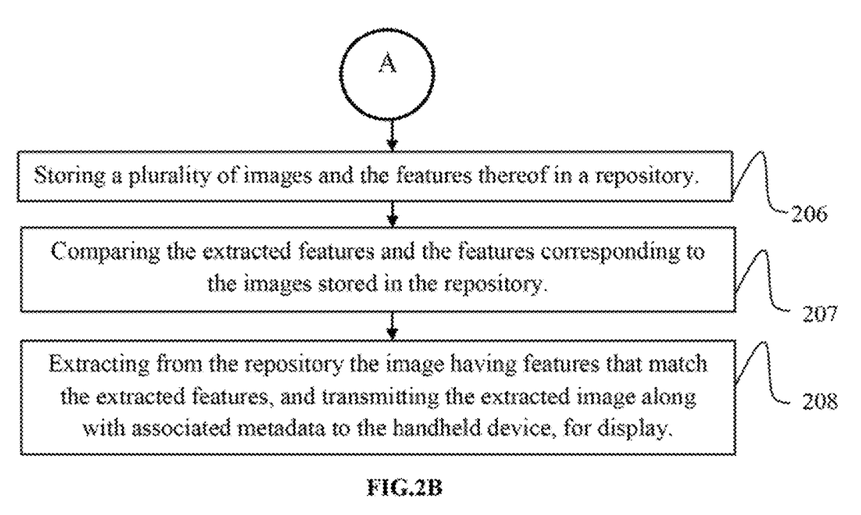

Referring to FIG. 2A and FIG. 2B in combination, a computer implemented method for managing text distracters in a visual search has been illustrated with reference to a flowchart. The method, in accordance with the present disclosure comprises the following computer-implemented steps:

- capturing an image using a handheld device and expressing captured image as a query image for eliciting at least the information relevant to the captured image (200);
- processing the query image using a text detection module and identifying from processed query image, the regions having textual content (201);
- processing the query image using a text detection module and identifying from processed query image, the regions having non-textual content (202);
- filtering the regions identified as having textual content, using a smoothing filter, and replacing the pixels corresponding to the textual content with a first set of pixels, thereby removing the textual content (203);
- filtering the regions having non-textual content, using the smoothing filter, only in the event that the regions having non-textual content are found in proximity the regions having textual content (204);
- extracting a plurality of features from the regions having non-textual content, using a feature extraction module (205);
- storing a plurality of images and the features thereof in a repository (206);
- comparing the features extracted by the feature extraction module and the features corresponding to the images stored in the repository, using a comparator (207); and
- extracting from the repository the image having features that match the features extracted by the feature extraction module, and transmitting the image extracted from the repository, along with associated metadata, to the handheld device accessible to the user, for display (208).

In accordance with the present disclosure, the method comprises the step of processing the regions having textual content, and replacing the pixels corresponding to the textual content with a first set of pixels thereby removing the textual content, wherein the values of the first set of pixels are computed by the smoothing filter.

In accordance with the present disclosure, the step of replacing the pixels corresponding to the textual content with a first set of pixels further includes the following steps:

- processing the regions having textual content, using smoothing filter; and calculating an average value corresponding to each of the color planes of the regions having textual content, and repetitively filling each of the regions having textual content with pixels having a value equal to the average value.

In accordance with the present disclosure, the step of extracting a plurality of features from the regions having non-textual content further includes the step of generating a plurality of feature descriptors.

In accordance with the present disclosure, the step of comparing the features further includes the step of computing, using the comparator, a score between the features extracted by the feature extraction module and the features corresponding to the images stored in the repository.

In accordance with the present disclosure, the step of computing a score further includes the step of representing the score as a function of distance between the features extracted by the feature extraction module and the features corresponding to the images stored in the repository.

In accordance with the present disclosure, the method further includes the following steps:

- processing offline, each of the images stored in the repository;
- identifying, offline, from processed images, the regions having textual content; and the regions having non-textual content.
- filtering, offline, the regions having textual content thereby reducing the keypoints therein, and replacing, offline, the pixels corresponding to the textual content with a first set of pixels thereby removing the textual content;
- filtering, offline, the regions having non-textual content, only in the event that the regions having non-textual content are found in proximity to the regions having textual content; and
- extracting, offline, a plurality of features from the regions having non-textual content;
- generating, offline, a plurality of feature descriptors corresponding to the extracted features; and
- linking extracted features with the corresponding images stored in the repository.

The present disclosure envisages a non transitory computer readable medium having computer readable instructions stored thereupon, the instructions when executed by a processor cause a computer enabled device to:

- capture an image express captured image as a query image for eliciting at least the information relevant to the captured image;
- process the query image and identify from processed query image, the regions having textual content, and the regions having non-textual content;
- filter the regions identified as having textual content and replace the pixels corresponding to the textual content with a first set of pixels having predetermined pixel values, thereby removing the textual content;
- selectively filter the regions having non-textual content, only in the event that the regions having non-textual content are found in proximity to the regions having textual content;
- extract a plurality of features from the regions having non-textual content;
- store a plurality of images and the features thereof, in a repository; compare the extracted features and stored features;
- identify the image having features that match the extracted features and display the identified image.

The computer readable instructions, when executed by the processor, further cause the computer enabled device to:

- process the regions having textual content, and calculate an average value corresponding to each of the color planes of the regions having textual content, and repetitively fill each of the regions having textual content with pixels having a value equal to the average value.
- extract a plurality of features from the regions having non-textual content and generate a plurality of feature descriptors.

compute a score between the features extracted by the feature extraction module and the features corresponding to the images stored in the repository.

represent the score as a function of distance between the features extracted by the feature extraction module and the features corresponding to the images stored in the repository.

The computer readable instructions, when executed by the processor, further cause the computer enabled device to:

process offline, each of the images stored in the repository;

identify, offline, from processed images, the regions having textual content; and the regions having non-textual content.

filter, offline, the regions having textual content thereby reducing the keypoints therein, and replace, offline, the pixels corresponding to the textual content with a first set of pixels thereby removing the textual content;

filter, offline, the regions having non-textual content, only in the event that the regions having non-textual content are found in proximity to the regions having textual content; and extract, offline, a plurality of features from the regions having non-textual content;

to generate, offline, a plurality of feature descriptors corresponding to the extracted features; and link extracted features with the corresponding images stored in the repository.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

We claim:

1. A computer implemented system for managing text distracters in a visual search, said system comprising:

a handheld device accessible to a user, said handheld device comprising image capturing capabilities, said handheld device configured to capture an image, and express captured image as a query image for eliciting at least the information relevant to the captured image;

a text detection module configured to process said query image and identify from processed query image, the regions having textual content, said text detection module further configured to identify from the processed query image, the regions having non-textual content;

a smoothing filter configured to filter the regions identified as having textual content thereby reducing the keypoints therein, said smoothing filter configured to replace the pixels corresponding to the textual content with a first set of pixels thereby removing the textual content, said smoothing filter further configured to filter the regions having non-textual content, only in the event that said regions having non-textual content are found in proximity to the regions having textual content;

a feature extraction module configured to extract a plurality of features from the regions having non-textual content;

a repository configured to store a plurality of images and the features thereof, wherein the features are extracted from at least non-textual regions of the images;

a comparator configured to compare the features extracted by the feature extraction module and the features corresponding to the images stored in the repository, said comparator further configured to extract from the repository the image having features that match the features extracted by the feature extraction module, said comparator still further configured to transmit the image extracted from the repository, along with associated metadata, to the handheld device accessible to the user, for display.

2. The system as claimed in claim 1, wherein said smoothing filter is further configured to process the regions having textual content, said smoothing filter further configured to calculate an average value corresponding to each of the color planes, and repetitively fill each of the regions having textual content with pixels having a pixel value equal to said average value, thereby removing the textual content.

3. The system as claimed in claim 1, wherein said feature extraction module is further configured to identify a plurality of features from the regions having non-textual content, said feature extraction module still further configured to generate a plurality of feature descriptors therefrom.

4. The system as claimed in claim 1, wherein said comparator is further configured to compute a score between the features extracted by the feature extraction module and the features corresponding to the images stored in the repository.

5. The system as claimed in claim 4, wherein said score is a function of distance between the features extracted by the feature extraction module and the features corresponding to the images stored in the repository, said distance selected from the group consisting of hamming distance, sum of squared errors, sum of absolute errors and maximum absolute error.

6. The system as claimed in claim 1, wherein:

said text detection module is further configured to process, in an offline mode, each of the images stored in said repository, said text detection module configured to identify from processed images the regions having textual content, and the regions having non-textual content;

said smoothing filter is further configured to filter, in the offline mode, the regions having textual content thereby reducing the keypoints therein, said smoothing filter configured to replace, in the offline mode, the pixels corresponding to the textual content with a first set of pixels thereby removing the textual content, said smoothing filter further configured to filter, in the offline mode, the regions having non-textual content, only in the event that said regions having non-textual content are found in proximity to the regions having textual content; and said feature extraction module further configured to extract, offline, a plurality of features from the regions having non-textual content, said feature extraction module further configured to link extracted features with the corresponding images stored in the repository.

7. A computer implemented method for managing text distracters in a visual search, said method comprising the following computer-implemented steps:
  capturing an image using a handheld device and expressing captured image as a query image for eliciting at least the information relevant to the captured image;
  processing said query image using a text detection module and identifying from processed query image, the regions having textual content;
  processing said query image using a text detection module and identifying from processed query image, the regions having non-textual content;
  filtering the regions identified as having textual content, using a smoothing filter, and replacing the pixels corresponding to the textual content with a first set of pixels, thereby removing the textual content;
  filtering the regions having non-textual content, using the smoothing filter, only in the event that said regions having non-textual content are found in proximity the regions having textual content;
  extracting a plurality of features from the regions having non-textual content, using a feature extraction module;
  storing a plurality of images and the features thereof in a repository;
  comparing the features extracted by the feature extraction module and the features corresponding to the images stored in the repository, using a comparator; and
  extracting from the repository the image having features that match the features extracted by the feature extraction module, and transmitting the image extracted from the repository, along with associated metadata, to the handheld device accessible to the user, for display.

8. The method as claimed in claim 7, wherein the method comprises the step of processing the regions having textual content, and replacing the pixels corresponding to the textual content with a first set of pixels thereby removing the textual content, wherein the values of said first set of pixels are computed by the smoothing filter.

9. The method as claimed in claim 7, wherein the step of replacing the pixels corresponding to the textual content with a first set of pixels further includes the following steps:
  processing the regions having textual content, using smoothing filter; and
  calculating an average value corresponding to each of the color planes of the regions having textual content, and repetitively filling each of the regions having textual content with pixels having a value equal to said average value.

10. The method as claimed in claim 7, wherein the step of extracting a plurality of features from the regions having non-textual content further includes the step of generating a plurality of feature descriptors.

11. The method as claimed in claim 7, wherein the step of comparing the features, further includes the step of computing, using said comparator, a score between the features extracted by the feature extraction module and the features corresponding to the images stored in the repository.

12. The method as claimed in claim 11, wherein the step of computing a score, further includes the step of representing the score as a function of distance between the features extracted by the feature extraction module and the features corresponding to the images stored in the repository.

13. The method as claimed in claim 7, wherein the method further includes the following steps: processing offline, each of the images stored in said repository;
  identifying, offline, from processed images, the regions having textual content; and the regions having non-textual content; filtering, offline, the regions having textual content thereby reducing the keypoints therein, and replacing, offline, the pixels corresponding to the textual content with a first set of pixels thereby removing the textual content;
  filtering, offline, the regions having non-textual content, only in the event that said regions having non-textual content are found in proximity to the regions having textual content;
  extracting, offline, a plurality of features from the regions having non- textual content; gene rating, offline, a plurality of feature descriptors corresponding to the extracted features; and
  linking extracted features with the corresponding images stored in the 1 s repository.

14. A non transitory computer readable medium having computer readable instructions stored thereupon, said instructions when executed by a processor cause a computer enabled device to:
  capture an image express captured image as a query image for eliciting at least the information relevant to the captured image;
  process said query image and identify from processed query image, the regions having textual content, and the regions having non-textual content;
  filter the regions identified as having textual content and replace the pixels corresponding to the textual content with a first set of pixels having predetermined pixel values, thereby removing the textual content;
  selectively filter the regions having non-textual content, only in the event that said regions having non-textual content are found in proximity to the regions having textual content;
  extract a plurality of features from the regions having non-textual content;
  store a plurality of images and the features thereof, in a repository;
  compare the extracted features and stored features;
  identify the image having features that match the extracted features and display the identified image.

15. The non-transitory computer readable medium as claimed in claim 14 wherein said computer readable instructions, when executed by the processor, further cause the computer enabled device to: process the regions having textual content, calculate an average value corresponding to each of the color planes of the regions having textual content, and repetitively fill each of the regions having textual content with pixels having a value equal to said average value;
  extract a plurality of features from the regions having non-textual content and generate a plurality of feature descriptors;
  compute a score between the features extracted by the feature extraction module and the features corresponding to the images stored in the repository; and
  represent the score as a function of distance between the features extracted by the feature extraction module and the features corresponding to the images stored in the repository.

16. The non-transitory computer readable medium as claimed in claim 14 wherein said computer readable instructions, when executed by the processor, further cause the computer enabled device to:
  process offline, each of the images stored in said repository;
  identify, offline, from processed images, the regions having textual content; and the regions having non-textual content;

filter, offline, the regions having textual content thereby reducing the keypoints therein, and replace, offline, the pixels corresponding to the textual content with a first set of pixels thereby removing the textual content;

filter, offline, the regions having non-textual content, only in the event that said regions having non-textual content are found in proximity to the regions having textual content;

extract, offline, a plurality of features from the regions having no-textual content;

generate, offline, a plurality of feature descriptors corresponding to the extracted features; and link extracted features with the corresponding images stored in the repository.

\* \* \* \* \*